(12) United States Patent
Musci

(10) Patent No.: US 12,370,851 B2
(45) Date of Patent: Jul. 29, 2025

(54) BUSHING ASSEMBLY FOR VEHICLES

(71) Applicant: John Peter Musci, Freehold, NJ (US)

(72) Inventor: John Peter Musci, Freehold, NJ (US)

( * ) Notice: Subject to any disclaimer, the term of this patent is extended or adjusted under 35 U.S.C. 154(b) by 482 days.

(21) Appl. No.: 17/822,544

(22) Filed: Aug. 26, 2022

(65) Prior Publication Data

US 2023/0173864 A1    Jun. 8, 2023

Related U.S. Application Data

(60) Provisional application No. 63/265,075, filed on Dec. 7, 2021.

(51) Int. Cl.
*B60G 11/22* (2006.01)
*B62D 7/22* (2006.01)

(52) U.S. Cl.
CPC ............... *B60G 11/22* (2013.01); *B62D 7/22* (2013.01); *B60G 2202/14* (2013.01); *B60G 2204/41* (2013.01)

(58) Field of Classification Search
CPC ...... F16F 1/3835; F16F 1/3842; B60G 7/001; B60G 11/22; B60G 2202/14; B60G 2204/41; B62D 7/22
USPC .................................................... 267/140.12
See application file for complete search history.

(56) References Cited

U.S. PATENT DOCUMENTS

| | | |
|---|---|---|
| 2,519,035 A | 8/1950 | Esty |
| 2,873,110 A * | 2/1959 | Jonsson .................... F16F 1/14 |
| | | 267/280 |
| 3,160,430 A | 12/1964 | Gottschald |
| 3,368,852 A | 2/1968 | Herbenar et al. |
| 3,781,073 A | 12/1973 | Jorn et al. |
| 3,982,598 A * | 9/1976 | Purcell .................... B60G 11/22 |
| | | 180/9.54 |
| 4,025,063 A * | 5/1977 | Willison ................ F16F 3/0876 |
| | | 267/153 |
| 4,678,350 A | 7/1987 | Statz |
| 5,000,429 A | 3/1991 | Wittmar et al. |
| 5,873,565 A | 2/1999 | Allaire |
| 6,692,179 B2 | 2/2004 | Bohne et al. |
| 7,367,744 B2 | 5/2008 | Funke |
| 7,380,775 B2 | 6/2008 | Niwa et al. |
| 9,429,192 B2 | 8/2016 | Astner et al. |

(Continued)

FOREIGN PATENT DOCUMENTS

| | | | |
|---|---|---|---|
| DE | 3425334 A1 | 1/1986 | |
| DE | 102018125459 A1 * | 4/2020 | ........... B60G 13/003 |

(Continued)

*Primary Examiner* — Robert A. Siconolfi
*Assistant Examiner* — San M Aung
(74) *Attorney, Agent, or Firm* — Dunlap Bennett & Ludwig, PLLC

(57) ABSTRACT

A bushing assembly for a vehicle including a first bushing with an inner diameter, an outer diameter, and interlocking teeth extending from it and a second bushing with an inner diameter, an outer diameter, and interlocking teeth extending from it. The first bushing and the second bushing are joined by their respective interlocking teeth. An inner sleeve with a first end and a second end is enclosed within the inner diameter of the first bushing and the inner diameter of the second bushing. A first compression cap on the first bushing is threadedly fastened to the inner sleeve, and a second compression cap on the second bushing is threadedly fasten to the inner sleeve.

6 Claims, 3 Drawing Sheets

(56) References Cited

U.S. PATENT DOCUMENTS

| | | |
|---|---|---|
| 10,577,024 B2 | 3/2020 | Flickinger et al. |
| 2012/0175831 A1 | 7/2012 | Kieffer |
| 2015/0113797 A1* | 4/2015 | Cha .................. B60G 7/02 29/724 |
| 2016/0226335 A1* | 8/2016 | Nicoloff ............... F16F 1/3835 |

FOREIGN PATENT DOCUMENTS

| | | | |
|---|---|---|---|
| EP | 2159345 A1 * | 3/2010 | .......... E04F 13/0855 |
| FR | 1086079 A | 2/1955 | |
| GB | 2008714 A | 6/1979 | |
| JP | 2016102506 A * | 6/2016 | ........... B60G 13/003 |

* cited by examiner

BUSHING ASSEMBLY FOR VEHICLES

CROSS-REFERENCE TO RELATED APPLICATION

This application claims the benefit of priority of U.S. provisional application No. 63/265,075, filed Dec. 7, 2021, the contents of which are herein incorporated by reference.

BACKGROUND OF THE INVENTION

The present invention relates to bushings and, more particularly, to a bushing assembly for vehicles.

Presently, all automobiles or vehicles use bushings to dampen and reduce noise, vibration, and harshness between two connected parts. Current bushings are comprised of an inner sleeve, an outer casing, glue, and a rubber center. When the bushing begins to tear, a control arm attached to the bushing extends further than it should, causing instability and shaking in a steering wheel when engaging brakes at a high speed. A worn bushing can lead to improper tracking, poor stability on turns, and loss of control.

Bushings also open up when vehicles turn, allowing grease and dirt to enter cavities. When contaminants enter a bushing assembly, they degrade the bushing causing premature failure. When glue failure or de-bonding occurs, the control arm is free to move about its fixed-point axis leading to misalignment and undesirable driving conditions.

All current bushings lack support from the bushing to both symmetrical ends of the inner sleeve. This lack of support causes premature failure over time due to constant cyclical loading.

Currently available bushings are not easy to assemble or install. Most importantly, they are prone to failure. Some present assemblies are based on inner and outer bushings which pair together usually requiring a press to hold it together for installation. This is a hardship for installers. Additionally, this is costly as it requires separate tools for left and right bushings. These tools may vary in size which creates additional inventory and overhead.

As can be seen, there is a need for a bushing that does not require precision tools to install and can be assembled quickly and rapidly with no more than a standard ratchet and torque set. Further, there is a need for a bushing that eliminates the complexities and design flaws in the currently available bushings and that outperforms the bushings presently in use and prevents failure.

SUMMARY OF THE INVENTION

In one aspect of the present invention, a bushing assembly for a vehicle comprises a first bushing with an inner diameter, an outer diameter, and interlocking teeth extending from a first surface of the first bushing, a second bushing with an inner diameter, an outer diameter, and interlocking teeth extending from a first surface of the second bushing, the first bushing and the second bushing being joined by their respective interlocking teeth, an inner sleeve with a first end and a second end enclosed within the inner diameter of the first bushing and the inner diameter of the second bushing, a first compression cap on a second surface of the first bushing, fasteners threadedly fasten the first compression cap to the first end of the inner sleeve, a second compression cap on an second surface of the second bushing, and fasteners threadedly fasten the second compression cap to the second end of the inner sleeve.

These and other features, aspects and advantages of the present invention will become better understood with reference to the following drawings, description, and claims.

DETAILED DESCRIPTION OF THE INVENTION

Figure 1:
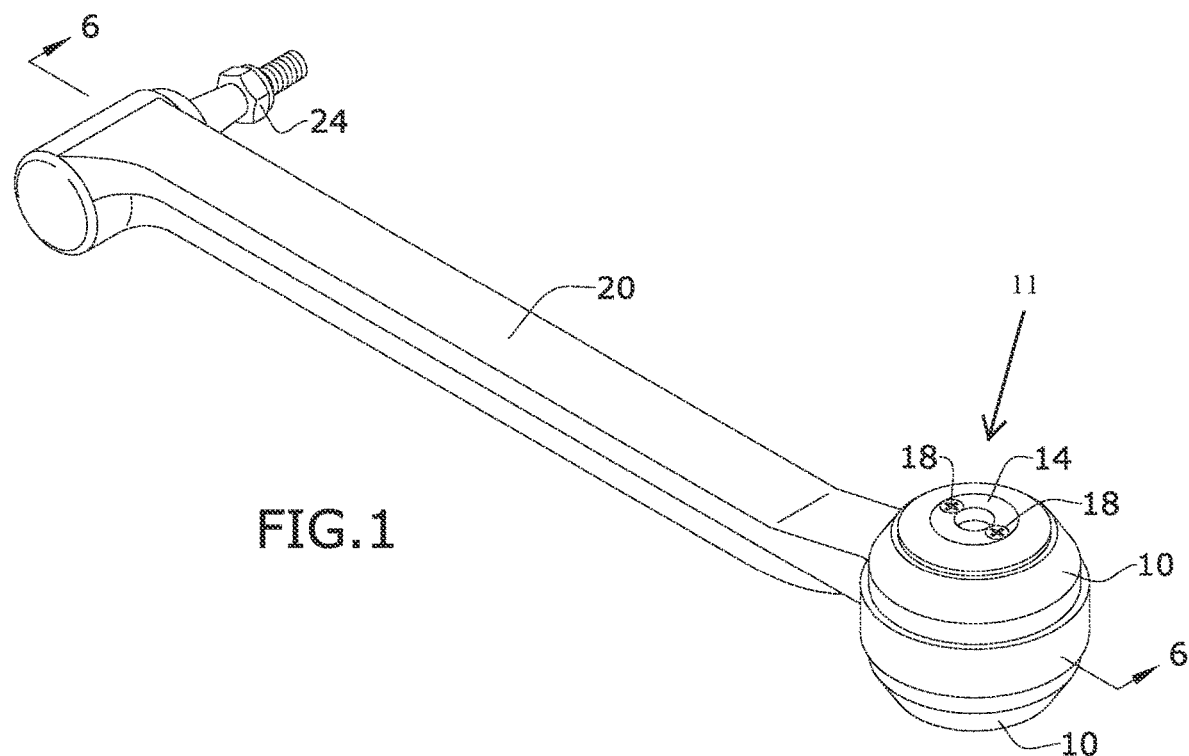
FIG. 1 is a perspective view of a bushing assembly and a control arm shown in use according to an embodiment of the present invention.
Figure 2:
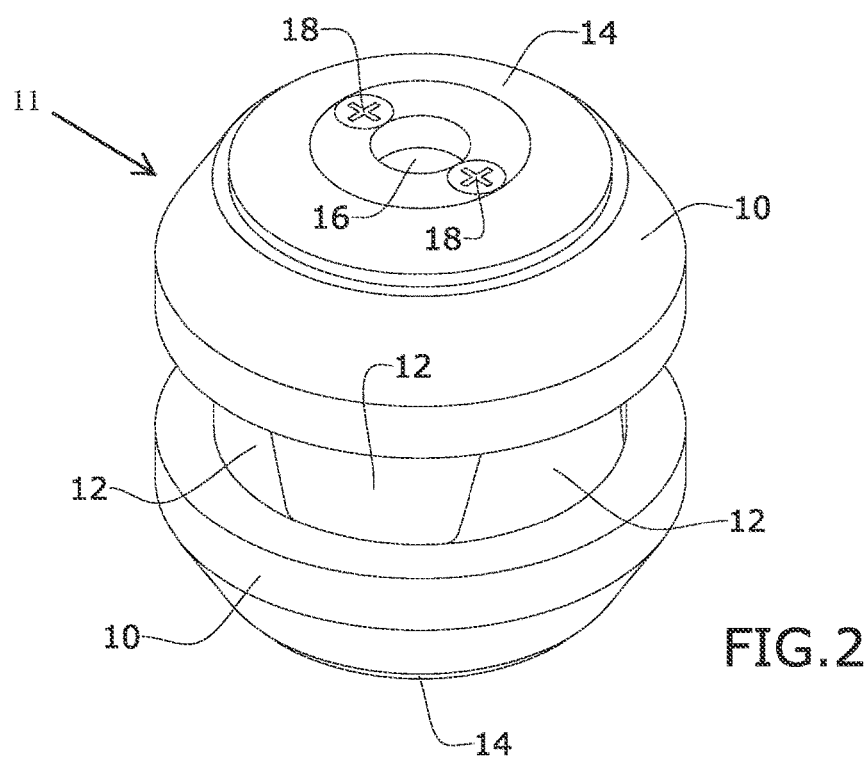
FIG. 2 is a perspective view of the bushing assembly thereof.
Figure 3:
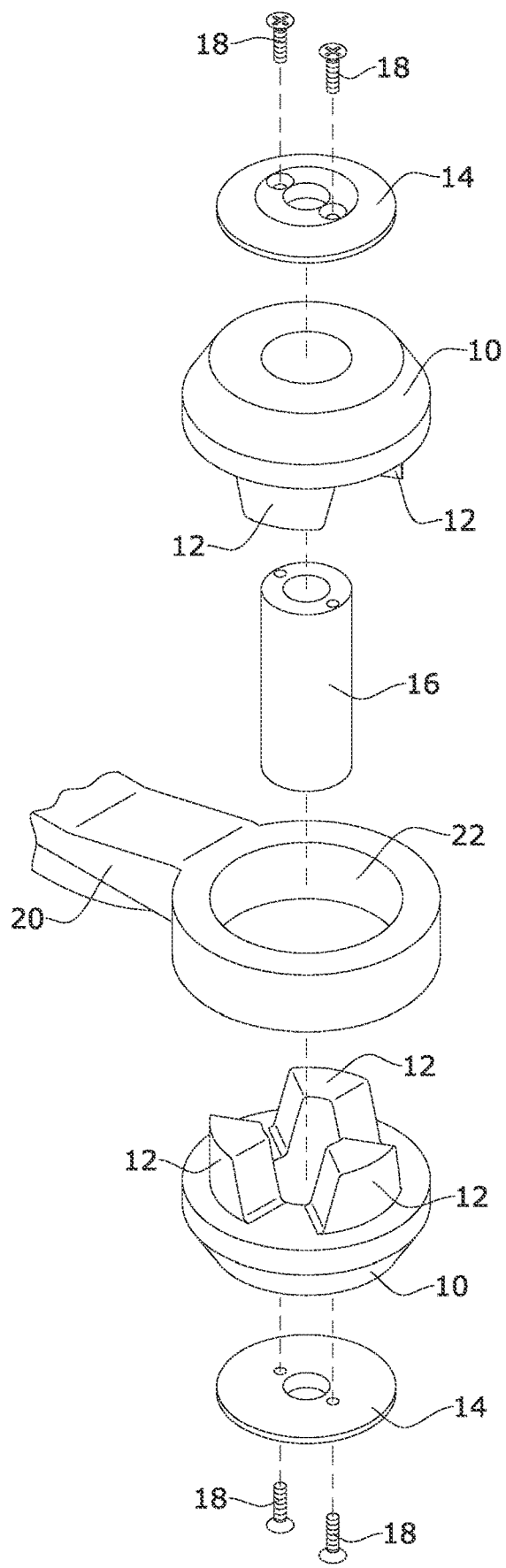
FIG. 3 is an exploded view of the bushing assembly thereof.
Figure 4:
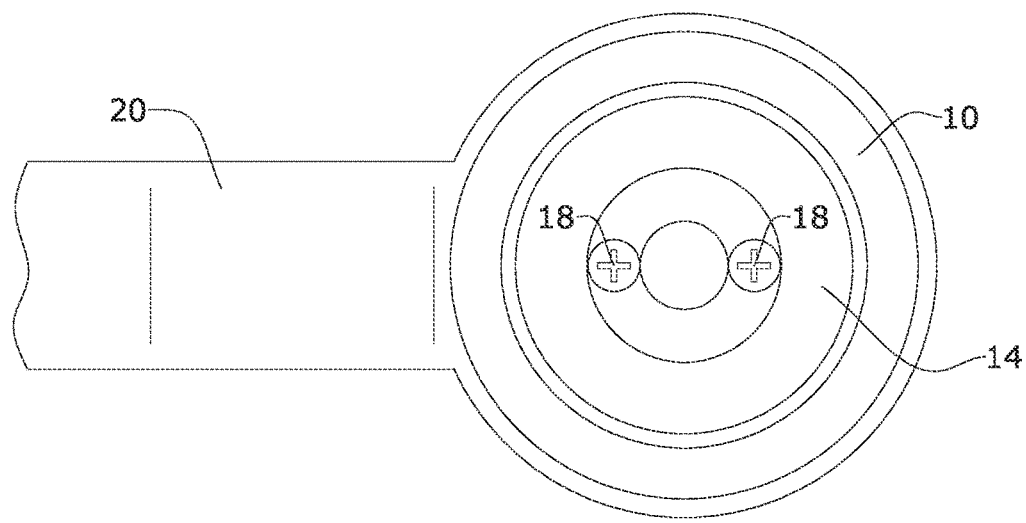
FIG. 4 is a top view of the bushing assembly thereof.
Figure 5:
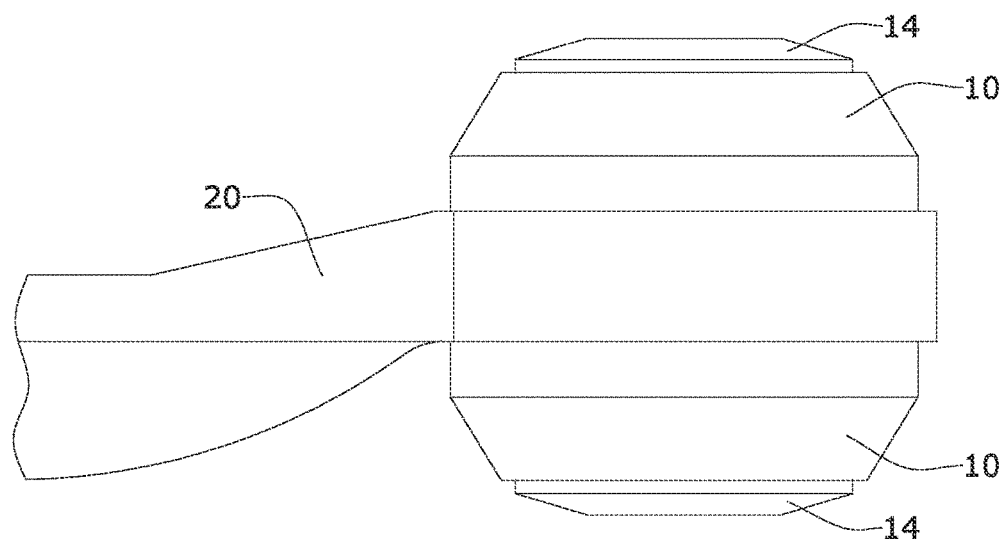
FIG. 5 is a side view of the bushing assembly thereof.
Figure 6:
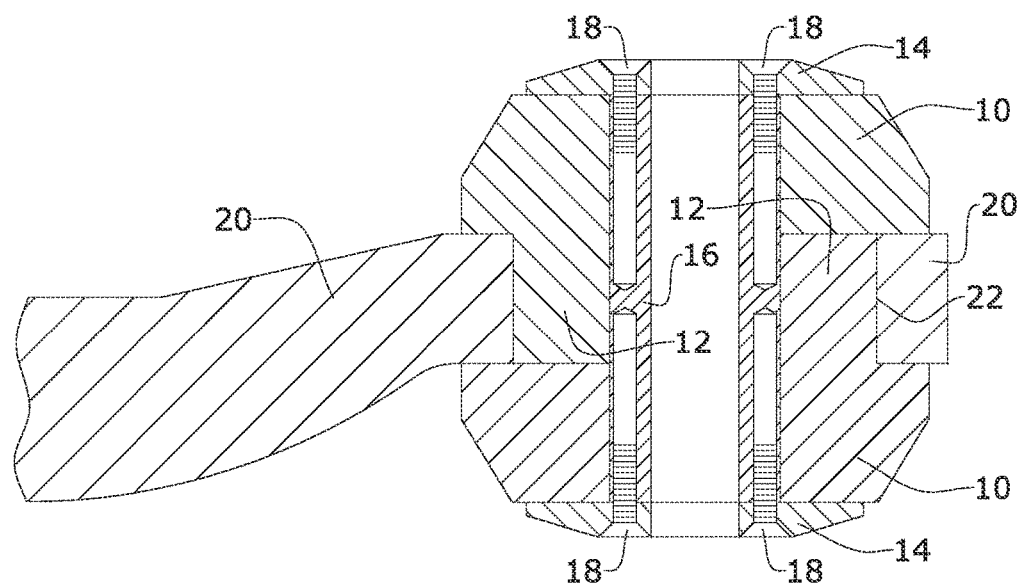
FIG. 6 is a sectional view taken on line 6-6 of FIG. 1.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

A general overview of the various features of the invention will be provided, with a detailed description following. Broadly, an embodiment of the present invention provides a bushing assembly comprising two interlocking bushings, an inner component or an inner sleeve, and a compression cap for each bushing. The assembly may be held together by fasteners, such as plurality of screws.

The present invention eliminates extra stresses on bushings for better support and rigidity and reduces failure. Once installed, the present invention outperforms many of the benefits, features, and properties of the present original equipment manufacturer (OEM) and aftermarket bushings. A bushing assembly of the present invention may be suitable for use as a replacement control arm bushing in the existing OEM and aftermarket bushing.

Currently, control arms typically have one end with a cylindrical cavity which connects to OEM and aftermarket bushings. The bushing assembly of the present invention may fit into the cylindrical cavity of the control arm.

Advantageously, the present invention makes use of compression caps to maintain compression on the bushing assembly. The compression may vary based on desired handling characteristics. The compression caps may be washers.

In some embodiments of the present invention, a pair of bushings may interlock around an inner component or an inner sleeve. The bushings may interlock by way of interlocking teeth. Alternatively, the bushings may interlock by abutting coarse surfaces. The interlocked bushings may be inserted into a first end of the control arm.

The inner sleeve may instead by an inner arm or an inner component. The inner sleeve may be rigid and metal. The inner sleeve may have two threaded holes on each end. The threaded holes on the same end of the inner sleeve may be symmetrically opposite of each other.

A pressure cap may be placed on a surface of a bushing. The pressure cap may each contain apertures, such as countersunk holes, which may align with the two threaded holes on an end of the inner sleeve. Two fasteners, such as screws, be inserted through the apertures of the pressure cap and into aligned holes on the inner sleeve. The fasteners may compress the pressure cap to the bushing as the cap is tightened onto the inner sleeve. This may tightly fit the bushings to the control arm.

When the bushings are compressed to a desired amount, the bushings press against each other and onto the control arm. This increases an inner friction between both entities causing a virtual bond in which the control arm and bushings act as one solid unit. The compression reduces and eliminates any unnecessary movement and forms a seal between the bushings and the control arm. The seal prevents outside contaminants from entering the assembly.

Advantageously, the compression caps and inner sleeve may be standard items available on the open market. This is in contrast to currently available bushings where an outer cup is nonstandard, and glue is required to maintain pressure or compression.

Pressure on the interlocking bushings generates an outward force against an inner bore of the control arm, as well as a force against the inner sleeve. This pressure is maintained by the pressure caps. The pressure bonds the interlocking bushings. The bushings then function as if they were a single bushing. This simultaneously prevents contaminants from entering the assembly and adds support to both ends of the sleeve and through to the control arm.

In some embodiments of the present invention, the interlocking bushing assembly comprises a first bushing with an inner diameter, an outer diameter, and interlocking teeth extending from a first surface of the first bushing. The interlocking bushing assembly further comprises a second bushing with an inner diameter, an outer diameter, and interlocking teeth extending from a first surface of the second bushing. The first bushing and the second bushing may be joined by their respective interlocking teeth. An inner sleeve may be enclosed within the inner diameter of the first bushing and the inner diameter of the second bushing. The inner sleeve may be cylindrical and have a first end and a second end. The inner sleeve may have an inner diameter and an outer diameter. A first compression cap may be placed on a second surface of the first bushing. Fasteners may threadedly fasten the first compression cap to the first end of the inner sleeve. A second compression cap may be placed on a second surface of the second bushing. Fasteners may threadedly fasten the second compression cap to the second end of the inner sleeve.

This bushing assembly may be configured in different embodiments. The interlocking teeth of the bushings may be replaced with flat ends or abutting surfaces that abut each other. Alternatively, the bushings may be a male/female bushing pair that fit into one another. In said embodiments, a first bushing may have a male piece that fits or interlocks into a female piece of a second bushing.

The assembly may be secured together using a press type fit, such as an interference fit, instead of the compression caps with fasteners. Any process able to secure two bushings together in a control arm may be used.

The type of material used for the bushings is not particularly limited to the present invention, and any type of material with a durometer rating ranging from 20 to 90 may be used. Such materials may include rubber, silicone, thermoplastic elastomer, thermoplastic polyurethane, and urethane.

Referring now to the Figures, FIG. 1 is a interlocking bushing assembly 11 according an embodiment of the present invention attached to a control arm 20. The interlocking bushing assembly 11 joins a joint 24 to a vehicle frame (not pictured) via the control arm 20. The vehicle frame may be attached to the interlocking bushing assembly 11.

As shown in FIGS. 2-6, the interlocking bushing assembly 11 comprises two bushings 10 with interlocking teeth 12, enclosing an inner sleeve 16. The teeth 12 of the two bushings 10 interlock between an opening 22 in the control arm 20. The two bushings 10 are compressed by a set of washers 14 and fasteners 18. The fasteners 18 fit through apertures in the washers 14 and into an apertures in the inner sleeve 16, applying pressure to the bushings 10.

It should be understood, of course, that the foregoing relates to exemplary embodiments of the invention and that modifications may be made without departing from the spirit and scope of the invention as set forth in the following claims.

What is claimed is:

1. A bushing assembly comprising:
   an abutting surface of a first bushing joined to an abutting surface of a second bushing;
   an inner component enclosed by the first bushing and the second bushing;
   the first bushing and the second bushing, while enclosing the inner component, fitting through an opening of a control arm;
   a plurality of fasteners and a first compression cap compressing the first bushing to the inner component; and
   a plurality of fasteners and a second compression cap compressing the second bushing to the inner component.

2. The bushing assembly of claim 1, wherein the first compression cap and the second compression cap are both washers.

3. The bushing assembly of claim 1, wherein the abutting surface of the first bushing further comprises interlocking teeth and the abutting surface of the second bushing further comprises interlocking teeth.

4. The bushing assembly of claim 1, wherein the abutting surface of the first bushing further comprises a male piece and the abutting surface of the second bushing further comprise a female piece.

5. The bushing assembly of claim 1, wherein the inner component is cylindrical.

6. The bushing assembly of claim 5, wherein the inner component has an inner diameter and an outer diameter.

* * * * *